(12) United States Patent
Gottlieb et al.

(10) Patent No.: US 7,516,574 B2
(45) Date of Patent: Apr. 14, 2009

(54) VERTICAL GARDEN

(76) Inventors: John Gottlieb, 12 Montauk Dr., Mastic Beach, NY (US) 11951; Wendy Gottlieb, 12 Montauk Dr., Mastic Beach, NY (US) 11951

( * ) Notice: Subject to any disclaimer, the term of this patent is extended or adjusted under 35 U.S.C. 154(b) by 641 days.

(21) Appl. No.: 11/315,930

(22) Filed: Dec. 22, 2005

(65) Prior Publication Data

US 2007/0144069 A1    Jun. 28, 2007

(51) Int. Cl.
*A01G 31/00* (2006.01)
(52) U.S. Cl. ............................................ 47/62 R; 47/82
(58) Field of Classification Search ...................... 47/82, 47/62 R
See application file for complete search history.

(56) References Cited

U.S. PATENT DOCUMENTS

| | | | |
|---|---|---|---|
| 307,936 A | 11/1884 | Fry | |
| 2,306,027 A * | 12/1942 | Swaney | 47/79 |
| 3,293,798 A | 12/1966 | Johnson | 47/34.12 |
| 3,451,622 A | 6/1969 | Forney | 239/20 |
| 4,006,559 A | 2/1977 | Carlyon, Jr. | 47/39 |
| 4,033,072 A * | 7/1977 | Kobayashi et al. | 47/62 R |
| 4,265,312 A | 5/1981 | Thein | 166/312 |
| 4,324,069 A | 4/1982 | Flagg | 47/62 |
| 4,419,843 A * | 12/1983 | Johnson, Sr. | 47/82 |
| 4,447,983 A | 5/1984 | Shinada | 47/48.5 |
| 4,603,506 A | 8/1986 | Powell, Jr. | 47/62 |
| 4,951,416 A * | 8/1990 | Gutridge | 47/62 R |
| 4,986,027 A | 1/1991 | Harvey | 47/59 |
| 5,315,787 A | 5/1994 | Schleicher | 47/79 |
| 5,337,515 A | 8/1994 | Robins | 47/62 |
| 5,363,594 A | 11/1994 | Davis | 47/82 |
| 5,440,836 A * | 8/1995 | Lee | 47/60 |
| 5,502,922 A * | 4/1996 | Shlomo | 47/62 R |
| 5,555,676 A | 9/1996 | Lund | 47/82 |
| 5,557,885 A * | 9/1996 | Sledge | 47/66.6 |
| 5,860,247 A | 1/1999 | Newby | 47/59 |
| 6,405,480 B1 | 6/2002 | Martin | 47/57.5 |
| 6,408,570 B1 | 6/2002 | Shih et al. | 47/79 |
| 6,477,805 B2 | 11/2002 | Ware | 47/83 |
| 6,615,542 B2 | 9/2003 | Ware | 47/83 |
| 7,055,282 B2 * | 6/2006 | Bryan, III | 47/62 R |
| 2002/0040548 A1 | 4/2002 | Ware | 47/83 |
| 2003/0089037 A1 | 5/2003 | Ware | 47/83 |
| 2004/0139651 A1 | 7/2004 | Harvey | 47/50 |

FOREIGN PATENT DOCUMENTS

| | | | |
|---|---|---|---|
| EP | 301362 A1 * | 2/1989 | |
| JP | 04229116 A | 8/1992 | |

* cited by examiner

*Primary Examiner*—Francis T Palo
(74) *Attorney, Agent, or Firm*—Alfred M. Walker

(57) ABSTRACT

A vertical garden includes a reservoir containing a nutrient rich liquid. A stack of modular planters are nested together above the reservoir. A vertically extending tubular pipe passes through central openings in the modular planters. The tubular pipe communicates with a manifold within the reservoir. An air pump located outside of the reservoir has an outlet hose terminating in an air inlet port in the manifold. Compressed air flows from the air pump into the manifold and flows up through the pipe to a diffuser plate at the top. Compressed air rises in the vertically extending pipe entraining some of said liquid upward towards the top diffuser plate. Each modular planter has radiating planter ports for growing plants, wherein the planter ports contain plant media. Nutrient rich liquid trickles down from the diffuser plate, intersecting with and soaking the plant media in the planter ports.

12 Claims, 4 Drawing Sheets

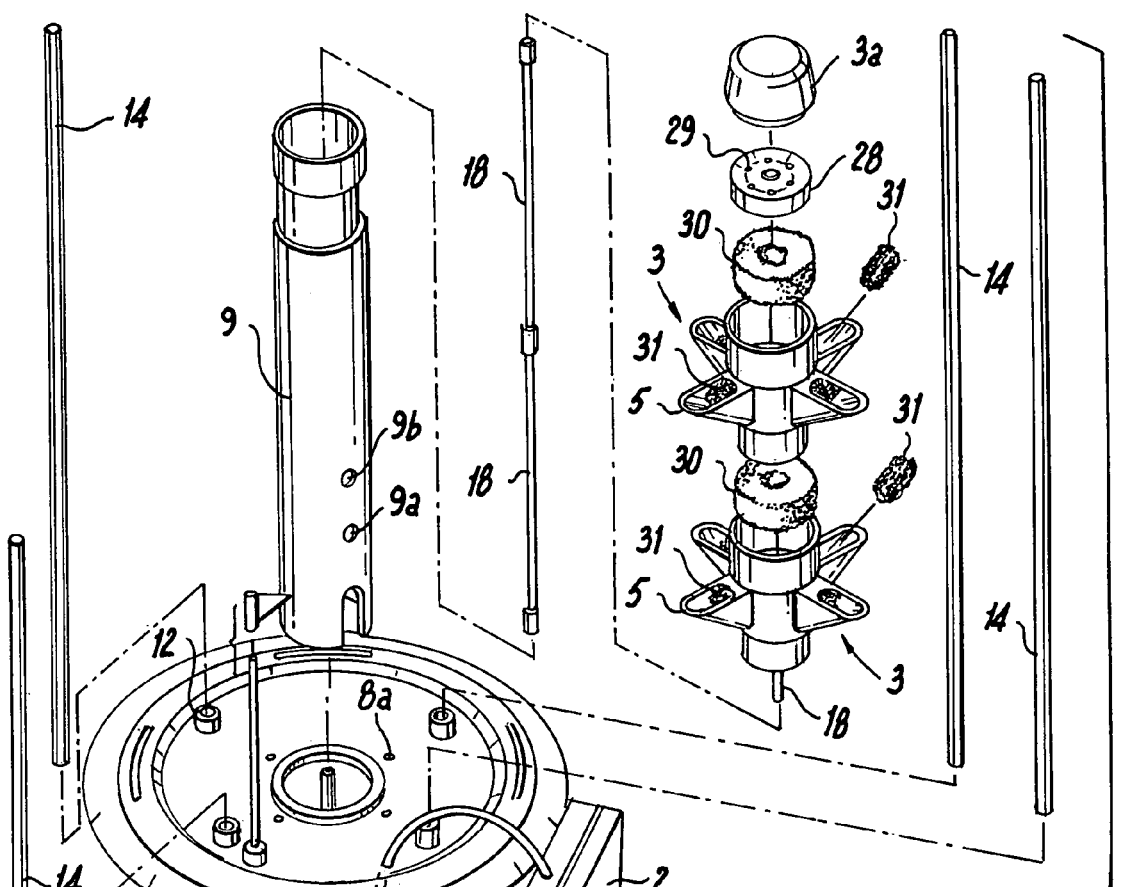
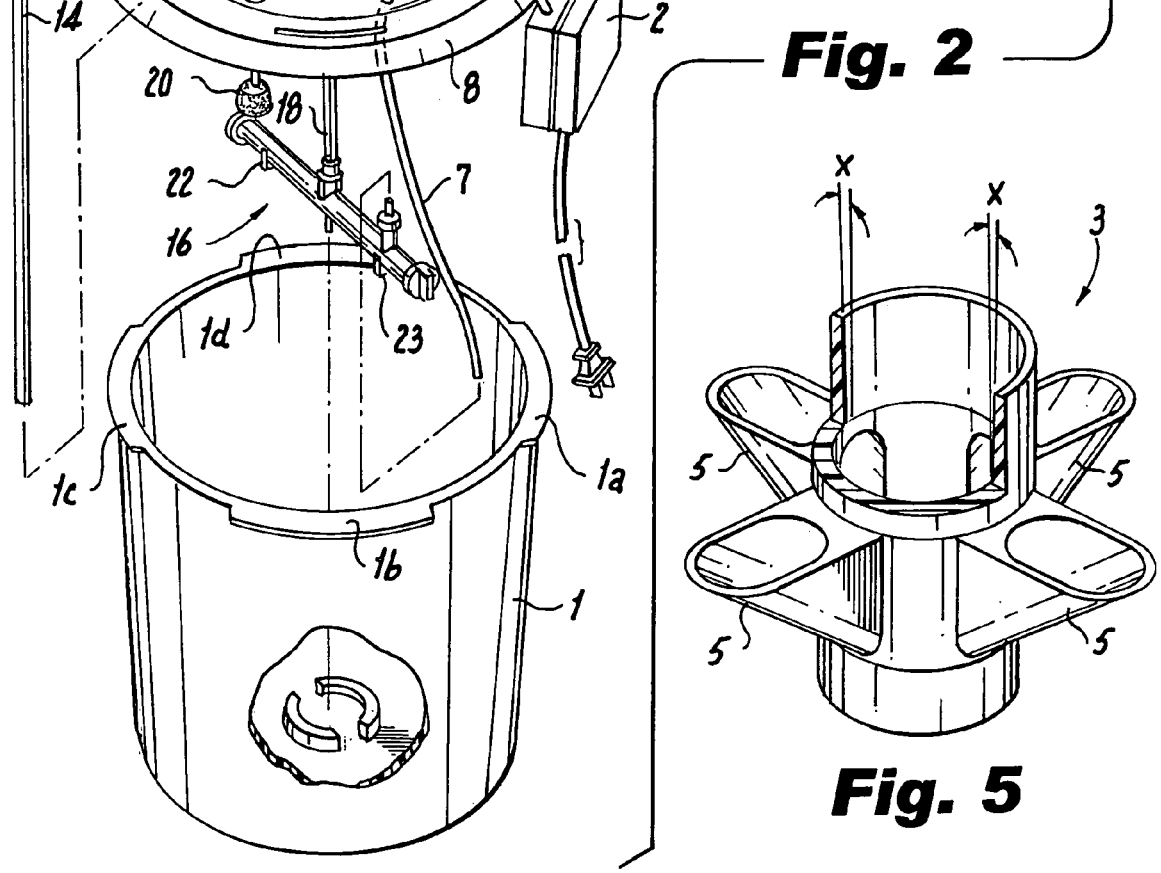
Fig. 2
Fig. 5

VERTICAL GARDEN

FIELD OF THE INVENTION

The present invention relates to vertical gardens with non-submersible water/air flow pumps which achieve upward flow of water/nutrient fluid mixtures without moving parts or valves.

BACKGROUND OF THE INVENTION

Vertical water gardens exist, but those with submersible air pumps present potential electrical safety problems.

Some vertical garden planters require extra sprinkler feeds at the top of the vertical garden, which adds unnecessary moving parts, as in U.S. Pat. No. 4,419,843 of Johnson.

U.S. Pat. No. 4,447,983 of Shineda uses a closed air valve such as used in automobile tires at the top of the flow chamber. In Shineda, the pressurized air from the air pump is released through a valve which is opened by upward movement of a float 34, but this requires moving parts and highly pressurized air.

In addition, U.S. Pat. No. 4,033,072 of Kobayashi describes an air inlet for a planter which has a check valve 34, with moving parts, which could present an unexpected failure mode when it sticks in the open or closed position. It requires compressed air to be introduced into the mixing tube with fluid pressure in the reservoir increasing so that the check valve can move to an open position, which are features not required by the present invention.

Additionally, U.S. Pat. No. 6,615,542 of Ware includes cylindrical planter ports which are placed obliquely outward from vertical columns. The fact that the cylinder ports are not truncated means that the outer end is slanted also. This tends to cause plant material to climb outward and droop downward.

In addition, in configurations with non-truncated cylindrical planter ports the water only flows up to the horizontal point of the lowest portion of the opening, so that if water is splashed upward, or is driven into root or plant-growing material above the water line, the nutrient salts in the mixture will accumulate as leachate and cause fertilizer burn to the plant material.

SUMMARY OF THE INVENTION

The present invention relates to a vertical garden planter with marginal planter port cartridge units stacked on top of each other. The planter port cartridge units include a central cylinder having a radiating array of obliquely placed truncated cylinders, which are each truncated at the top to provide a horizontal top edge allowing for a maximum water flow up to the edge of each planter port.

The truncated cylindrical plant ports each emanate outward at an oblique angle, slanting upward from the central column of each modular unit.

Water flows downward through the central column of joined modular planter cartridges to each array of radiating planter ports The vertical garden uses a trickle up pump to supply an upward flow of water from the lower nutrient/water mixture reservoir. The pump is not submersed in the water, thereby having no submersible electrical parts. The reason for avoiding submersible pumps in the reservoir at the bottom of the planter is for maintenance purposes and for electrical safety purposes.

Air is pumped from the exterior pump into a manifold located within the lower reservoir of water and nutrients.

The non-submersible air pump and manifold send air bubbles into the vertical planter and then pump water and nutrients upward by the flow of the air bubbles. Thus, liquid is entrained in the air flow and is moved to the top of the planter.

Since the non-submersible pump has no internal moving parts or check valves exposed to water and plant nutrients, there is very little chance of clogging up with leachate. The pump just pumps clean ambient air; it is typically an oscillating diaphragm pump driven by a solenoid.

The vertical planter requires no separate return line of water and nutrients since the water is urged up by the small air pump, and flows down by gravity within the central column. The pump air outlet flows through a sealed conduit to the tubular manifold conduit which is located at the bottom of the reservoir. Water and nutrient is pulled into a small jet hole in the bottom of the manifold tube from the reservoir by venturi flow action. Thereafter the water is pushed up by the air bubbles into a centrally located vertical column of interchangeable conduits formed by the array of stacked modular planter cartridges, to a top outlet where the water and nutrient mixture flows through a shallow diffuser plate with a circular array of inlet holes in a downward flow of the mixture. The mixture, when descending down the central inner column formed by the stacked planter cartridges, intersects and soaks the respective plant media, such as units of rock wool, located within the central column.

The plants are fed nutrients from the water/nutrient mixture, which flows into hollow cylindrical units of rock wool, which are placed stacked inside the central column of each planter module, preferably with an airspace separating each rock wool cylinder. Thereafter, the nutrients flow further through rock wool plugs, which are placed into each one of the preferably four radiating plant ports emanating outward from the central modular stackable column. These rock wool plugs are preferably box or cubic shaped.

Each plant port is a truncated cylinder, horizontal at the top, so that the top forms a partially ovoid opening, horizontal to the surface. Plugs of rock wool media are plugged into this truncated, cylindrical port and into each other of the cylindrical, truncated ports of the modular unit and the plant material is inserted into the nutrient-fed rock wool.

As water flows into the truncated plant ports, there is no dry area in the plant port to accumulate nutrient leachate salts, because water flows up to each horizontal, upper ledge.

BENEFITS OF THE INVENTION

One benefit of the present invention is that it does not require a separate return line for the water since the inner delivery tube is within the central column of the stacked, modular planter cartridges with radiating planter ports, which obviate the need for a return tube, since the central column of each modular cartridge acts as the return of the water it drips down through the hollow cylindrical rock wool portions until any excess reaches back into the reservoir at the bottom.

The manifold and air pressure system of the present invention is capable of lifting air and nutrient to a height of 15 inches or more, thus increasing the height of the growing planter.

Because the water drips down to the central reservoir, there is no risk of water spilling in any major quantity outward onto the floor.

The rock wool cylinders can have air gaps between them to prevent roots from infiltrating from one rock wool component to the other.

The air pump of the present invention is typically driven by an oscillating solenoid; an example is a Meiko Products air pump that moves a diaphragm at high rate to create the pumping action for delivering compressed air to its outlet port. It is also noted that the hole in the bottom of the manifold can be fitted with substitute plugs so that the sizes can be varied for different sized jet holes for different pressures.

An optional moisture probe can be provided to sense dryness so that the pump can be activated when needed, such as for example on a rotating schedule such as 15 minutes per hour during daylight hours.

The present invention has many benefits. It does not require any moving parts such as flap valves and does not require separate return lines for water. The small air pump supplies a flow of air that is fed to the manifold conduit at the bottom of the reservoir. The water and nutrient is pulled in from the reservoir by the venturi flow action of the heavy water pressure into the small jet hole in the bottom of the manifold and is then pushed up by the air pressure and water pressure combined to the vertical column of interchangeable planter cartridges to a top outlet of a diffuser plate where it flows through the diffuser plate with holes into which are spaced circumferentially so that the water flows downwardly into a plurality of holes intersecting the respective plant media, such as the cylindrical units of rock wool.

The rock wool is held in the cartridge modules, which are basically cylindrical bodies with a spanning scoop shape, truncated planter rings having horizontal outer edges to keep water from spilling out. While four are shown in the drawings, any number of planter ports can be placed along the outer perimeter of the cylindrical modules. Seeds or cuttings or plant plugs can each be inserted into the wings adjacent to the rock wool plant-accommodating media.

The wet rock wool media controls the fluid absorption, although that can be also be varied by timer control to allow for dry periods for plants which are susceptible to root rot, (such as tomatoes) and a moisture probe can then sense dryness to activate the pump if conditions are too dry.

The top of the reservoir cap can have the recess to accommodate lattices for the vine-growing plants, such as tomatoes or grapes. It is easy to clean by just inserting the spew plug in the top of the input delivery tube which will then cause turbulence in the line back to the water reservoir where the turbulence will help clean out the line in the manifold.

Another benefit of the present invention, is that it does not require a submersible pump to pump water to the growing media and it also does not require a top gravity feed sprinkler to cause fluids to flow downward to the growing modules, such as U.S. Pat. No. 4,419,843 of Johnson.

The present invention does not require a separate compressed air source for aerating the soil since the air/water mixture will provide oxygen to the rock wool or other growing media.

The present invention uses a simple air-powered manifold, which has significant benefits not disclosed in a vertical planter with a submersible pump, or with top-mounted water feeds.

The present invention causes a gradual, upward trickle rather than a strong pumping force so that the water can be constantly fed at a gentle flow to the plant and the planter.

The present invention does not require a closed air valve or other moving parts.

Therefore, the benefits of the present invention are that there are no moving parts, no flapper valves, no check valves, etc., which reduces any possible failure modes. Because of the configuration and the use of air bubbles for moving the nutrient-rich fluid, the hydro stacked garden of the present invention uses very little electricity to operate the exterior, non-submersible air pump. Each planter port section is designed to offer overflow so that surface tension will cause minimal water or nutrient loss.

The planter ports are shaped at an angle for optimal plant support and they accept the rock wool growing media cubes easily below the surface of the water. The growing planter modular cartridges are simple and easy to install. If there is any clogging of media, it is easy to remove one cartridge and replace the clogged rock wool. This provides the gardener with growing sections which can be easily cleaned and replaced during the planting season. The rock wool growing media cartridges are disposable and can be discarded and replaced. The cylindrical shape of the growing media rock wool cartridges provides a space for the delivery tubes to ascend upward therethrough and also permits diffusion of the water flowing downward to reach all the ports which are radially extended about the circumference of each planter growing modular cartridge.

The locking cover is easy to remove and close and provides a darkness to prevent light entering the water media and thereby prevents the growth of algae in the water. Utilizing air as a lifting mechanism there is no risk of electric shock, and low maintenance cost.

All the parts are easily assembleable or dissassembleable and are easily cleaned and stored. The height of the cartridge can be varied depending on the number of vertical plant growing modular cartridges which are stacked.

The low maintenance growing cartridge provides an aesthetically pleasing indoor garden which takes up minimal space in a room, while providing abundant vegetation.

DESCRIPTION OF THE DRAWINGS

The present invention can best be understood in connection with the accompanying drawings. It is noted that the invention is not limited to the precise embodiments shown in drawings, in which:

FIG. 2 is an exploded perspective view showing the components of the vertical garden of the present invention;

FIG. 5 is a close-up perspective view in partial crossection of a typical plant-growing module, illustrating an inwardly tapering wall;

DETAILED DESCRIPTION OF THE INVENTION

Figure 1:
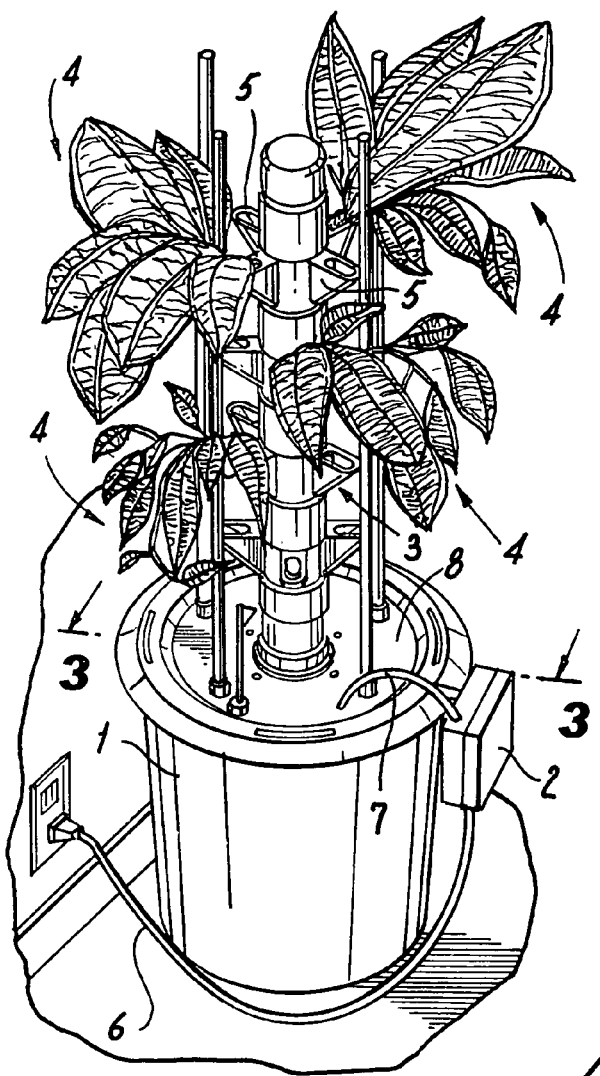
FIG. 1 is a top perspective view of the vertical garden of the present invention, showing a plurality of plant growing modules, such as four of the plant growing modules stacked on top of each other.

FIG. 1 shows the nutrient/fluid reservoir 1 supporting a non-submersible air pump 2 and the stacked modular plant-growing portions 3 sprouting plants 4 therefrom, including four radially extending, truncated cylindrical plant ports 5, slanted upward but with horizontal top edges. The ports 5 are truncated at the horizontal edge and preferably also truncated at the opposite side surfaces. Electrical line and wall plug 6 and air pump outlet air line 7 are also shown.

As also shown in FIG. 1, each of these modular members 3 is stackable one on top of the other to form a column, where each module is stacked on top of the other and the plant grows out of the ports.

Figure 3:
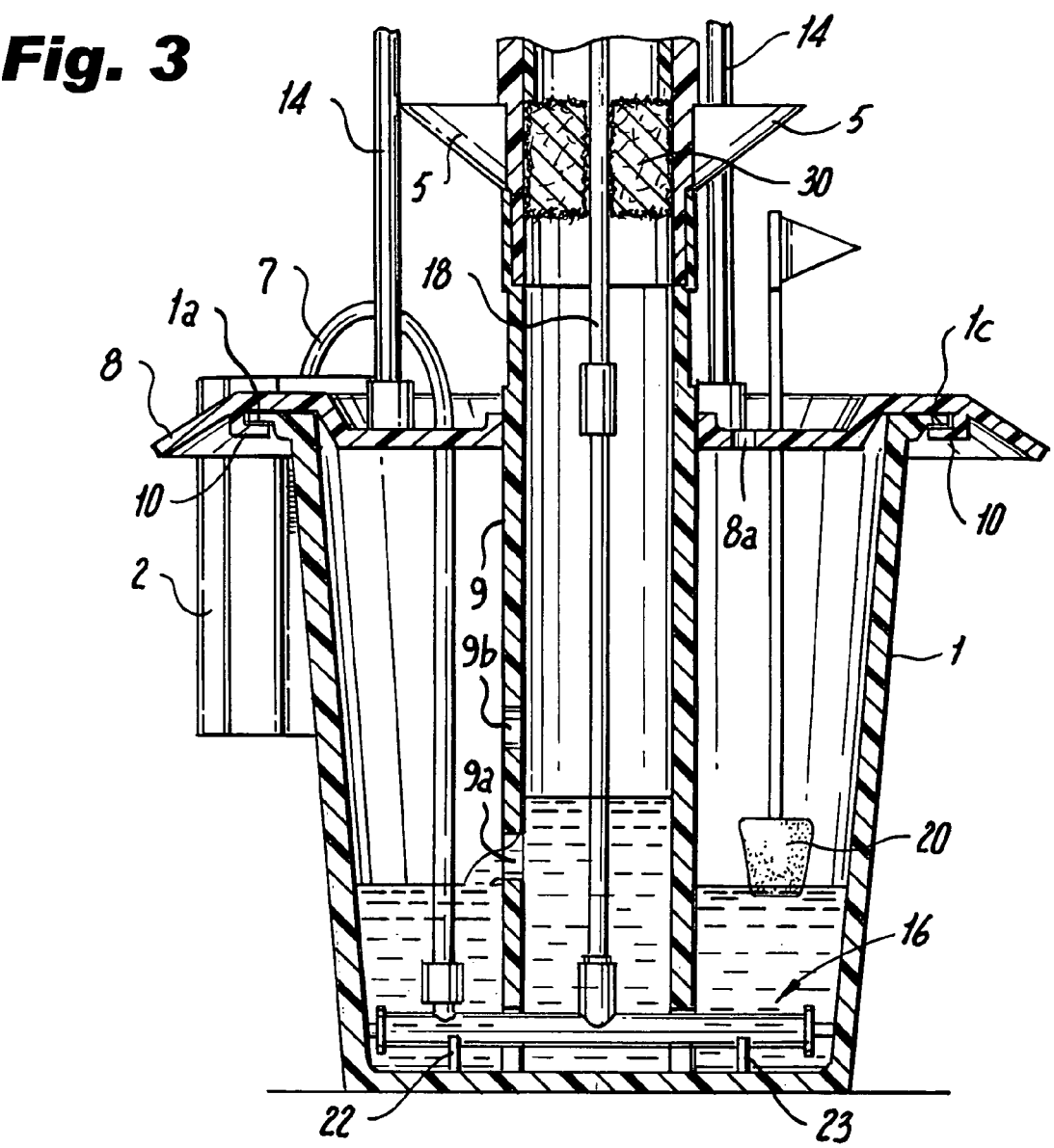
FIG. 3 is a close-up crossectional view of the lower portion of the vertical garden, showing the inter-relationship of the reservoir and air pumping components and their structural relationship to the stacked modular plant growing portions.

In the bottom of FIGS. 1 and 3 is shown a fluid reservoir 1, which is preferably a five-gallon, cylindrical reservoir, as also shown in the exploded view of FIG. 2. It includes a lower, cylindrical reservoir 1, as well as a top and cover 8, which has four local L-shaped flanges 10, which interlock with extending circumferential tabs 1a, 1b, 1c and 1d at the top edge of the reservoir 1, so that the reservoir can be easily locked and unlocked in place by rotating cover 8 to release the flanges 10. The center of the top cover has a bore, which receives support tube 9, best seen in FIG. 2. Tube 9 rests on the bottom surface of reservoir 1, and serves to support the plurality of plant-growing modules 3. The cover also has a plurality of optional trellis supports 12 with trellises 14 for vine plants such as grapes or tomatoes to be placed extending upward adjacent to the central column.

Figure 6:
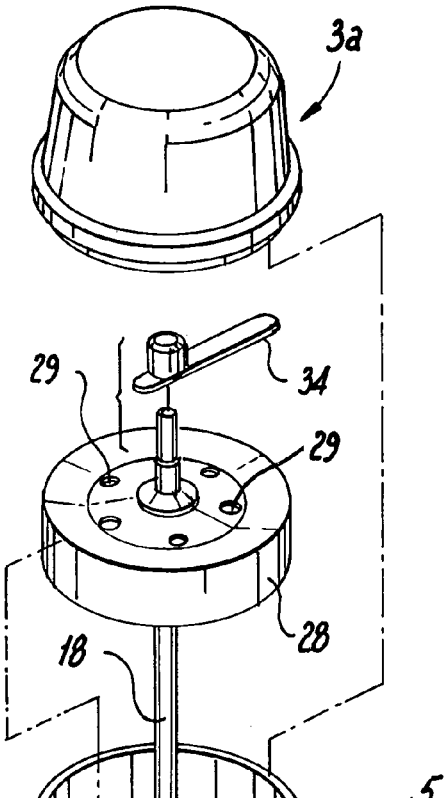
FIG. 6 is an exploded view of the upper components of the present invention, shown in partial cutaway; and, FIG. 7 is a side crossectional view of the upper region of the vertical garden.
Figure 6:
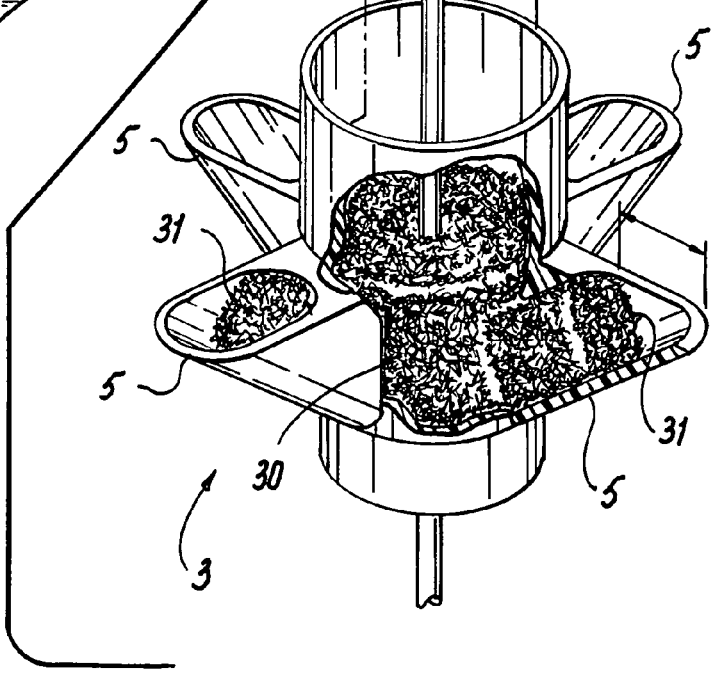
Figure 4:
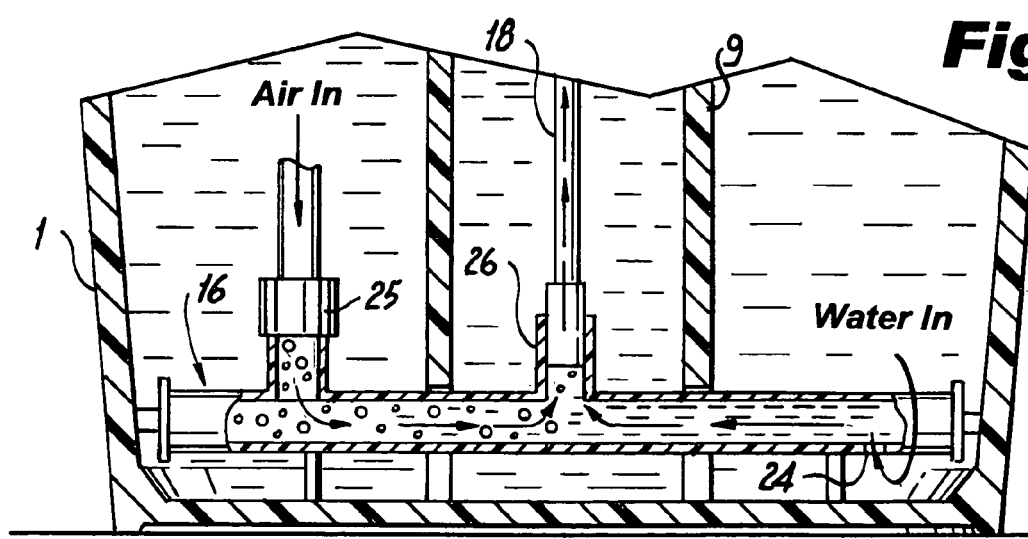
FIG. 4 is an enlarged, side crossectional view of the manifold of the present invention.
Figure 7:
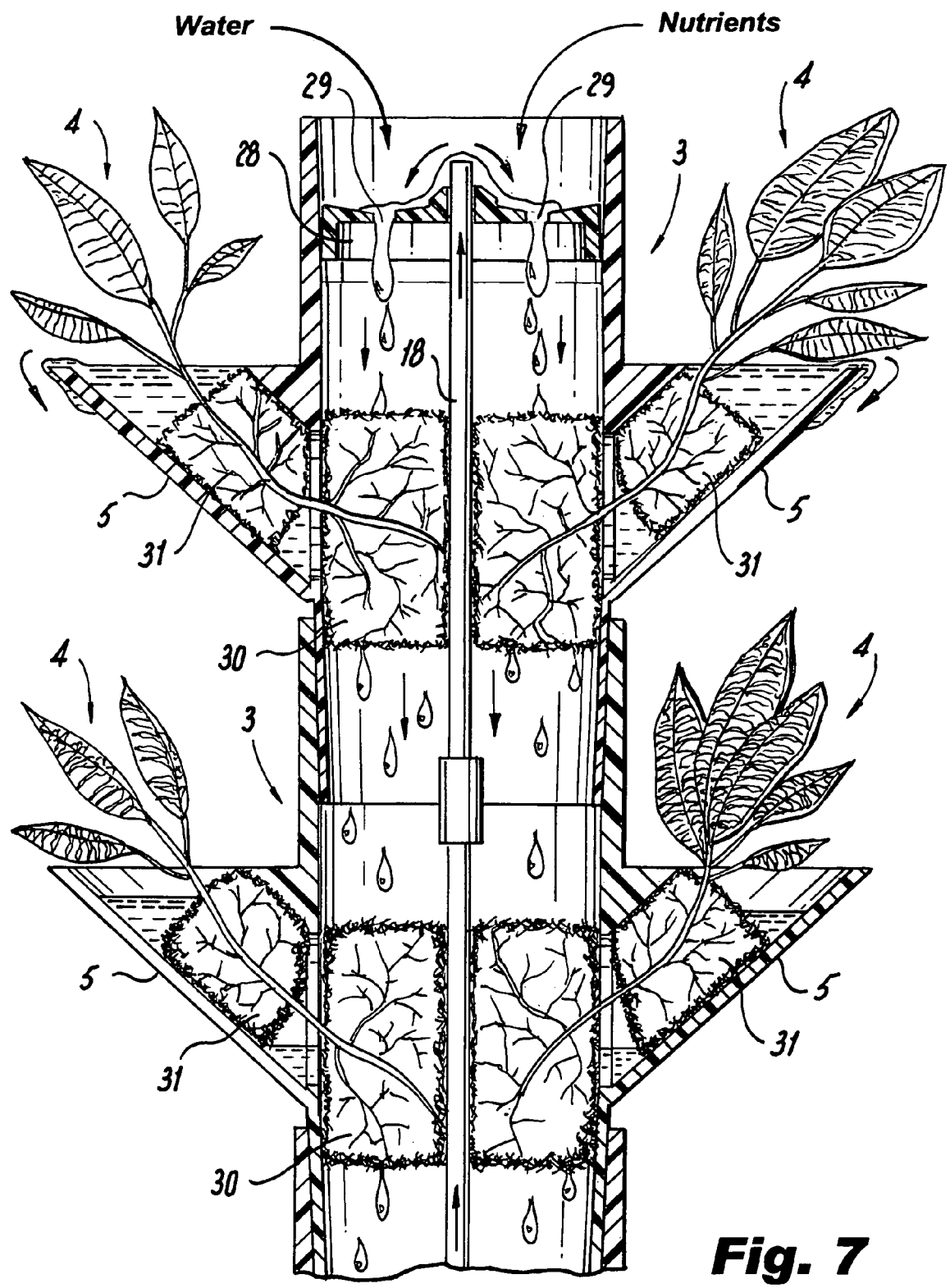

In FIG. 3, as well as in FIG. 4, there is shown the manifold 16 and connecting fluid delivery inner tube which extends upward therefrom in modular, cylindrical, tubular sections 18 attached to the manifold 16. These tubular sections are contained within support tube 9, and continue vertically within plant-growing modules 3, finally protruding through bore of diffuser plate 28, as best seen in FIGS. 6 and 7. FIG. 2 also shows an indicator flag float 20, which is operable, depending on the amount of water left, so that the gardener user can determine whether the reservoir 1 is low in nutrients and fluid.

In addition, FIGS. 1, 2 and 3 also show the air pump 2 disposed on a peripheral edge of cover 8.

A closer view of the manifold 16 is shown in FIG. 4, which is a side crossectional view respectfully of the manifold 16.

The manifold 16 basically includes a horizontally-oriented, tubular member, the perspective view of which is shown in FIG. 2, which is retained in place by support stanchions 22 and 23 at each end, as shown in FIGS. 3 and 4. There is a slight tilt in the support stanchions, wherein the one closest stanchion 22 to the air inlet port 25 is raised slightly higher than the one at the opposite end 23 where the metering jet hole 24 is located, so that the slant causes the activated bubbles caused by the air mixing with the nutrient fluid to go up at the first opportunity, as at central delivery port 26.

As shown in FIG. 4, the tubular manifold member has a metering jet hole inlet 24 at the opposite end, located on the bottom of the manifold 16 so that water from the water pressure of the five gallons of water in the reservoir would push downward and against and then upward into the metering jet hole, so that the exterior water pressure in the fluid reservoir puts pressure on air in the manifold 16, thereby mixing the air with the water in air bubbles. Besides oxygenating the water, this also causes an upward flow of the air/water bubble mixture up through the central delivery port 26 from the manifold 16 into the central tubular conduits 18, which continue upward to the top of the unit where they trickle out to a diffuser plate 28 as shown in FIG. 7.

As shown in FIG. 6, the diffuser plate includes a central outlet for water/nutrient mixture. The outlet is located in a slightly raised, domed portion in the center of the diffuser plate 28, which also has a plurality of drip holes 29 arrayed radially, for the upwardly emitted water to then drip downward into the central support tube 9 and through the adjacent rock wool media 30 and 31, which is shown in stippled lines in the perspective top view of FIG. 6 and crossectional view of FIG. 7. As seen in FIG. 3, tube 9 is equipped with exhaust openings 9a and 9b, to allow for communication of fluid within tube 9 and reservoir 1.

FIG. 6 shows the relationship between diffuser plate 28, and uppermost module 3. As seen in the cutaway of module 3 in FIG. 5, the inner wall diameter has a slight inwardly tapering draft angle, as shown at "X". Therefore, when the diffuser plate 28 is placed into module 3, there is a friction fit with the tapered wall to accommodate grade changes so that if the planter happens to be placed outdoors on a slight slant, the diffuser plate 28 can be placed slightly askew so that it will remain horizontally oriented, tapered to the upper growing modular section 3. This allows the diffuser plate 28 to be angled for an even distribution of water nutrient solution, even if placed on an uneven or sloped grade.

FIG. 6 also shows a sprue plug 34 for mixing nutrients and cleaning the inner, central delivery tubes 18 and the manifold 16. When air is forced from the pump and the water outlet is closed by the sprue plug 34, a backwashing occurs whereby the bubbles reverse direction, causing downward pressure which will clean out any accumulated nutrient leachate or used water in the central column of delivery tubes 18 and ultimately will clean out the manifold 16 for easy maintenance.

In FIGS. 2, 3, 6 and 7 the cylindrical rock wool 30 has a central bore, so that the plant roots will not clog up the area where the central tubular conduits 18 are located. A marginal growing section is needed to allow for locally cleaning out the roots if a particular rock wool cylinder 30 is clogged. Therefore, if one area of rock wool is clogged with too many roots, it is very simple to disassemble the unit by removing the diffuser plate 28, removing the central intake tubes 18 and then the particular module 3 containing the clogged rock wool 30 to be replaced.

The outer rock wool media 31 is always flooded inside the plant port 5 so no salt burns will occur from leachate leaching onto an inner edge of the plant port 5 and harming the roots of plant 4, as seen in FIG. 7.

Surface tension causes the water to run down the surface, not to drip over and cascade down away from the edge of the planter port 5 of growing sections 3. Should fluid escape from ports as seen in FIG. 7, the fluid will drip down onto cover 8, or travel down tube 9 and collect on cover 8. Cover 8 is provided with four deep weep holes 8a, so that collected fluid will be delivered into reservoir 1. Additionally, the flat edge and angled interior surface of each of the plant ports 5 of growing sections 3, serve to support and prevent drooping of plants, as shown by the dimension line in FIG. 6.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:
1. A vertical garden comprising:
a reservoir containing a nutrient rich liquid;
a stack of modular members nested together above said reservoir;
a vertically extending pipe passing through central openings in said modular members, said pipe communicating with an enclosed, extended manifold adjacent a bottom of said reservoir;
an air pump outside of said reservoir having an outlet hose terminating in an air inlet port adjacent one end of said manifold so that compressed air flowing from said air pump enters said manifold and flows up through said vertically extending pipe;

said manifold having a liquid inlet port at an opposite end of said manifold allowing inflow of said liquid, the compressed air rising in said vertically extending pipe entraining some of said liquid, an entrance to said vertically extending pipe being between said air and water inlet ports;

means comprising a diffuser plate for covering a central opening at a top of the uppermost modular member having an opening to accommodate an upper end of said vertically extending pipe extending above said diffuser plate and a plurality of openings in said diffuser plate to permit liquid exiting from the top end of said vertically extending pipe to drip down through said modular members, the upper end of said vertically extending pipe having an unrestricted outlet; and each modular member having radiating planter ports for growing plants, said planter ports containing plant media, whereby said nutrient rich liquid is delivered to said stack of modular members without any moving parts in said reservoir or stack of modular members.

2. The vertical garden of claim 1 in which said planter ports comprise obliquely arranged cylinders with truncated open ends to provide a horizontal top edge of each planter port.

3. The vertical garden of claim 2 in which the water inlet end of said manifold is slightly lower than said air inlet end of said tube to insure that all incoming air enters said vertically extending pipe.

4. The vertical garden of claim 3 in which the liquid inlet port is on a bottom surface of said manifold.

5. The vertical garden of claim 4 having a sprue plug to close the outlet in said vertically extending tube to cause backwashing for cleaning out any accumulated nutrient leachate in the vertically extending tube.

6. The vertical garden of claim 5 in which the plant media is rock wool extending into the central openings of said modular members, said rock wool surrounding and in contact with said vertically extending pipe, whereby water dripping down from said diffuser plate passes through said media in all modular members to said reservoir.

7. A vertical garden comprising:

a reservoir containing a nutrient rich liquid, said reservoir having an open top;

a generally flat cover enclosing said open top, said cover having a central opening;

a vertically extending pipe passing through said central opening terminating adjacent a bottom of said reservoir communicating with a horizontally extending, enclosed manifold;

an air pump outside of said reservoir having an outlet hose extending through said cover terminating in a liquid inlet on said manifold adjacent one end of said manifold so that compressed air flowing from said air pump enters said manifold and flows up through said vertically extending pipe;

said manifold having a liquid inlet port adjacent an opposite end of said manifold allowing inflow of said liquid, the compressed air rising in said vertically extending pipe entraining some of said liquid;

a stack of modular members nested together and supported at a bottom thereof above said central opening with said vertically extending pipe extending up through central passageways in said modular members;

a diffuser plate covering the central passageway at a top of the uppermost modular member, said diffuser plate having an opening to accommodate an upper end of said vertically extending pipe and a plurality of openings to permit liquid exiting from the upper end of said vertically extending pipe to drip down trough said modular members;

each modular member having radiating planter ports for growing plants, said planter ports containing plant media, said plant media surrounding and in contact with said vertically extending pipe; and whereby said nutrient rich liquid trickling down from said diffuser plate drips down through said plant media in each modular member thereby soaking the plant media in said planter ports.

8. The vertical garden of claim 7 in which each modular member has a tapered wall and said diffuser plate is friction fit into its modular member so that said diffuser plate is adjustable allowing said diffuser plate to remain horizontal even when said vertical garden is on a sloped grade, thereby allowing even distribution of nutrient solution.

9. The vertical garden of claim 8 in which said planter ports comprise obliquely arranged cylinders with truncated open ends to provide a horizontal top edge of each planter port.

10. The vertical garden of claim 9 in which said cover has circumferential tabs for engagement with tabs on said reservoir so that said reservoir can be easily locked and unlocked in place.

11. The vertical garden of claim 9 in which said reservoir has an indicator float with a flag extending out through said cover to indicate how much liquid remains in said reservoir.

12. The vertical garden of claim 7 having a removable cap which covers the central passageway of the uppermost modular member, said cap enclosing said diffuser plate and said vertically extending pipe thereby containing water leaving the opening in the upper end of said vertically extending pipe within said uppermost modular member.

* * * * *